United States Patent
Prasad et al.

(10) Patent No.: US 8,406,396 B2
(45) Date of Patent: Mar. 26, 2013

(54) COMMUNICATION SYSTEM AND PROCESSING METHOD

(75) Inventors: Anand Raghawa Prasad, Tokyo (JP); Thilo Ewald, Heidelberg (DE); Toshiyuki Tamura, Tokyo (JP); Stefan Schmid, Heidelberg (DE)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/266,392

(22) PCT Filed: Apr. 22, 2010

(86) PCT No.: PCT/JP2010/002925
§ 371 (c)(1),
(2), (4) Date: Jan. 5, 2012

(87) PCT Pub. No.: WO2010/125777
PCT Pub. Date: Nov. 4, 2010

(65) Prior Publication Data
US 2012/0134484 A1    May 31, 2012

(30) Foreign Application Priority Data
Apr. 30, 2009  (JP) ............................ P2009-110817

(51) Int. Cl.
*H04M 1/56* (2006.01)
(52) U.S. Cl. ........... 379/142.05; 379/88.02; 379/142.01; 379/142.06; 379/142.08; 379/142.1
(58) Field of Classification Search ... 379/142.01–142.1
See application file for complete search history.

(56) References Cited

U.S. PATENT DOCUMENTS

| 8,271,603 B2* | 9/2012 | Wilson et al. ................. 709/207 |
| 2004/0196968 A1* | 10/2004 | Yue ........................... 379/210.02 |
| 2007/0071212 A1* | 3/2007 | Quittek et al. ............ 379/210.02 |
| 2008/0226047 A1* | 9/2008 | Reumann et al. ........ 379/142.04 |
| 2008/0292077 A1* | 11/2008 | Vinokurov et al. ...... 379/142.04 |
| 2009/0052648 A1 | 2/2009 | Lankes |
| 2009/0147936 A1* | 6/2009 | Won et al. ................. 379/201.02 |

FOREIGN PATENT DOCUMENTS

| JP | 2003-229955 | 8/2003 |
| JP | 2004-214782 | 7/2004 |
| JP | 2006-261918 | 9/2006 |

OTHER PUBLICATIONS

International Search Report, PCT/JP2010/002925, May 25, 2010.

* cited by examiner

*Primary Examiner* — Joseph J Nguyen
(74) *Attorney, Agent, or Firm* — Young & Thompson

(57) ABSTRACT

A communication system shares terminal identification information (TII) used for identifying a terminal that sends a spam phone call, with another communication system belonging to another network provider, and includes: a storage section that stores the TII of a terminal that sends a spam phone call; a transmission section that transmits the TII stored in the storage section to the other communication system; a reception section that receives the TII used for identifying the terminal that sends the spam phone call; a registration section that registers the TII received by the reception section in the storage section; and a spam phone call determination section that determines whether there is a match between terminal information indicating information of an outgoing call terminal that sends a connection request, and the TII stored in the storage section, thereby determining whether the outgoing call terminal sends a spam phone call.

4 Claims, 7 Drawing Sheets

COMMUNICATION SYSTEM AND PROCESSING METHOD

TECHNICAL FIELD

The present invention relates to a communication system that is a basis for providing multimedia services including voice services on an IP network, and a processing method.

BACKGROUND ART

In the recent move towards IP (Internet Protocol), it is considered, without exception, to introduce IP on voice communication systems, of which telephone networks are representative. In the 3GPP (3rd Generation Partnership Project) which is a standards organization associated with mobile communications, standardization of IMS (Internet Multimedia Subsystem) is being implemented as a basis for providing multimedia services such as voice services on IP networks. In recent years the 3GPP has been investigating the use of IP on fixed-lines known as NGN (Next Generation Network).

In today's electronic mail services, the behavior of senders sending mail unilaterally, against the wishes of receivers, which is called spam or junk mail, has become a social issue. As a background to this issue, reasons can be considered in that communication costs have dropped significantly accompanying the ubiquitous of the Internet, and that it is possible to send mass e-mails from a network access terminal such as a personal computer, which can be obtained easily.

It is considered that there is a high possibility that IMS will also get into a similar situation that today's e-mail service is in. A study of techniques for protecting users from this SPIT (spam over IP Telephony) has been started, called PUCI (Preventing against Unsolicited Communication for IMS), in the 3GPP field.

A technique is disclosed in Patent Document 1, which determines whether a call is SPIT or not using a blacklist.

PRIOR ART DOCUMENT

Patent Document

[Patent Document 1]
United States Patent Application, Publication No. 2009/0052648 Specification

SUMMARY OF THE INVENTION

Problem to be Solved by the Invention

However, conventionally, since every network provider updates SPIT identification information individually, there is a high possibility that the duration before identification information of the same SPIT is recognized among communication systems of the network providers will increase. For example, even if a network provider newly identifies a SPIT sending terminal, every network provider updates the identification information of the SPIT individually. As a result, there is a possibility that it takes time for the other network providers to be able to identify the sending terminal. Furthermore, even if a network provider canceled a SPIT designation associated with a sending terminal, since the other network providers have not cancelled the SPIT designation associated with the sending terminal, there is a possibility that it takes time for the sending terminal to be able to use the communication networks of the other network providers.

The present invention has been made in consideration of the above-described points, with an object of providing a communication system and a processing method that reduces the duration over which there is a discrepancy in SPIT identification information among communication systems of other network providers.

Means for Solving the Problem

The present invention has been made in order to solve the above-described problems. A communication system according to the present invention shares terminal identification information used for identifying a terminal that sends a spam phone call, with another communication system belonging to another network provider, and includes: a storage section that stores terminal identification information of a terminal that sends a spam phone call; a transmission section that transmits the terminal identification information stored in the storage section to the other communication system; a reception section that receives, from the other communication system, the terminal identification information used for identifying the terminal that sends the spam phone call; a registration section that registers the terminal identification information received by the reception section in the storage section; and a spam phone call determination section that determines whether or not there is a match between terminal information indicating information of an outgoing call terminal that sends a connection request, and the terminal identification information stored in the storage section, thereby determining whether or not the outgoing call terminal sends a spam phone call.

Moreover, a processing method according to the present invention uses a communication system including a storage section that stores terminal identification information used for identifying a terminal that sends a spam phone call, and sharing the terminal identification information with another communication system, and including: transmitting, by a transmission section, terminal identification information stored in the storage section to the other communication system; receiving, by a reception section, terminal identification information used for identifying the terminal that sends the spam phone call, from the other communication system; registering, by a registration section, the terminal identification information received by the reception section in the storage section; and determining, by a spam phone call determination section, whether or not there is a match between terminal information indicating information of an outgoing terminal that sends a connection request, and the terminal identification information stored in the storage section, thereby determining whether or not the outgoing call terminal sends a spam phone call.

Effects of the Invention

According to the present invention, the spam phone call determination section determines whether or not the outgoing call terminal is sending a spam phone call based on the terminal identification information received by the reception section from the other communication system. As a result, since the communication system can determine a spam phone call using the terminal identification information updated by other communication system, it is possible to reduce the duration over which there is a discrepancy in the terminal identification information among the communication system of the other network provider.

EMBODIMENTS FOR CARRYING OUT THE INVENTION

First Exemplary Embodiment

Hereunder is a detailed description of exemplary embodiments of the present invention with reference to the drawings.

Figure 1:
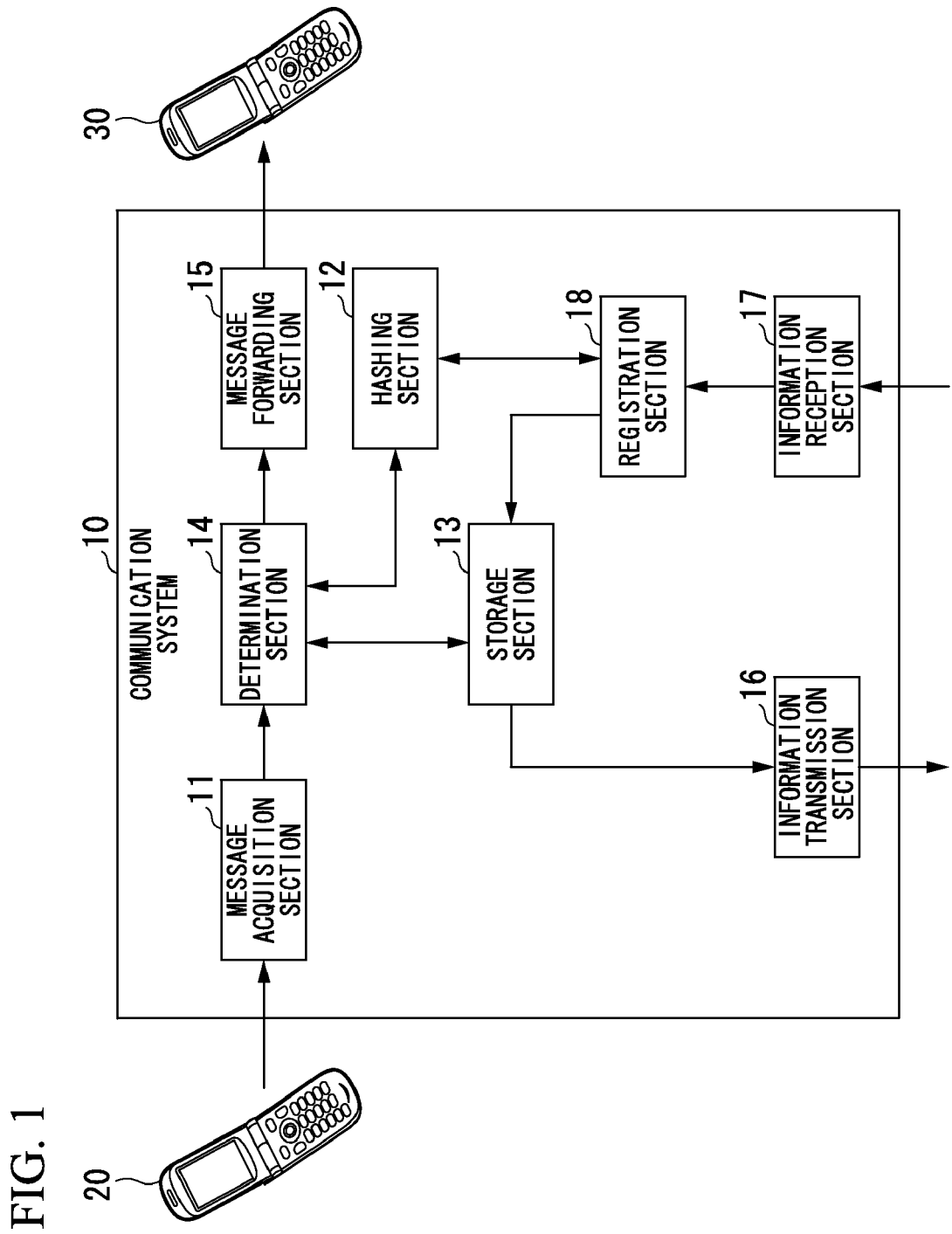
FIG. 1 is a schematic block diagram showing the structure of a communication system according to an exemplary embodiment of the present invention.

FIG. 1 is a schematic block diagram showing the structure of a communication system according to a first exemplary embodiment of the present invention.

A communication system 10 includes a message acquisition section 11, a hashing section 12, a storage section 13, a determination section 14 (spam phone call determination section), a message forwarding section 15, an information transmission section 16 (transmission section), an information reception section 17 (reception section), and a registration section 18.

The message acquisition section 11 acquires a connection request message from an outgoing call terminal 20.

The hashing section 12 hashes the terminal identification information of the outgoing call terminal 20, which is attached to the connection request message, and terminal identification information used for identifying unauthorized terminals, using a predetermined hash function. The terminal information attached to the connection request message is for example, information including a plurality of pieces of information indicating the outgoing call terminal 20, such as the telephone number, the terminal ID, the type of terminal, and the like, of the outgoing call terminal 20. The terminal identification information used for identifying unauthorized terminals is for example, information registered in a black list for determining whether the outgoing call terminal 20 is an unauthorized terminal, and a white list for determining whether the outgoing call terminal 20 is not an unauthorized terminal. The terminal identification information includes one or more pieces of information among the information which constitutes the terminal information.

The hashing section 12 hashes information that can identify terminals uniquely among information contained in terminal information and terminal identification information, such as a telephone number or a terminal ID. Since the information that can identify the outgoing call terminal 20 uniquely is personal information, this is performed in order to prevent the information from being misused after the other communication systems receive the terminal identification information by the processing described later. The type of information that the hashing section 12 hashes is set by an operator or the like in advance.

The storage section 13 stores terminal identification information used for identifying unauthorized terminals that send a spam phone call (SPIT). The terminal identification information stored by the storage section 13 is information that is hashed by the hashing section 12.

The determination section 14 determines whether or not the outgoing call terminal 20 is an unauthorized terminal based on the terminal information of the outgoing call terminal 20 attached to the connection request message and the terminal identification information stored in the storage section 13.

A message forwarding section 15 forwards the connection request message to an incoming call terminal 30 in the case where the determination section 14 determines that the outgoing call terminal 20 is not an unauthorized terminal.

The information transmission section 16 transmits the terminal identification information stored in the storage section 13 to other communication systems.

The information reception section 17 receives terminal identification information used for identifying unauthorized terminals from other communication systems.

The registration section 18 registers the terminal identification information received by the information reception section 17 in the storage section 13.

In the communication system 10, the information transmission section 16 transmits the terminal identification information stored in the storage section 13 to other communication systems. The information reception section 17 receives the terminal identification information from other communication systems. The registration section 18 registers the terminal identification information received by the information reception section 16 in the storage section 13. The determination section 14 determines whether or not there is a match between the terminal information of an outgoing call terminal 20 that sends a connection request, and the terminal identification information stored in the storage section 13, thereby determining whether or not the outgoing call terminal 20 has sent a spam phone call.

As a result, the duration over which there is a discrepancy in the terminal identification information used for identifying unauthorized terminals among the communication systems of other network providers is reduced.

Next is a description of the operation in which the communication system 10 shares terminal identification information with other communication systems.

Figure 2:
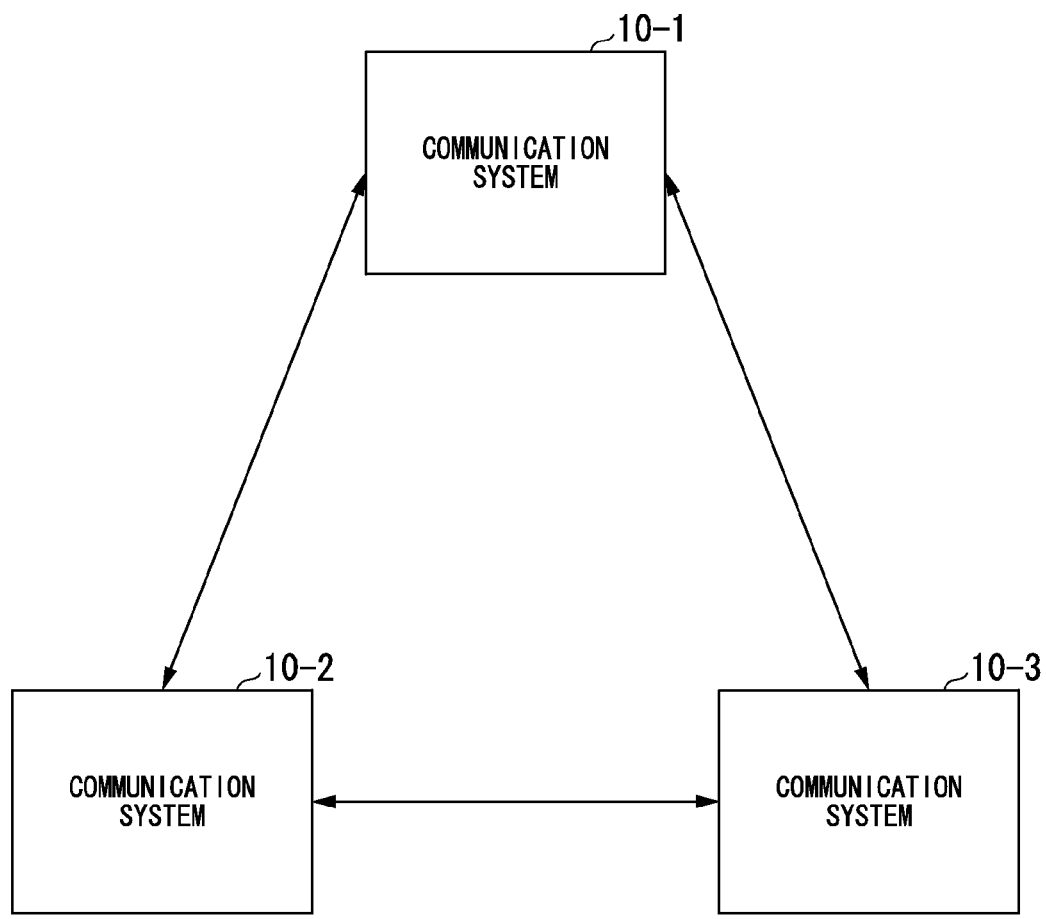
FIG. 2 is a schematic diagram showing the structure of an information sharing system according to a first exemplary embodiment, which connects communication systems.

FIG. 2 is a schematic diagram showing the structure of an information sharing system according to the first exemplary embodiment, which connects communication systems.

In the information sharing system according to the first exemplary embodiment, communication systems 10-1 to 10-3 of different network providers are connected to each other by communication lines. The communication systems 10-1 to 10-3 have the same construction as the above-described communication system 10. Here a case is described in which the information sharing system includes three systems, being communication systems 10-1 to 10-3. However, in practice, the information sharing system includes three or more communication systems.

Figure 3:
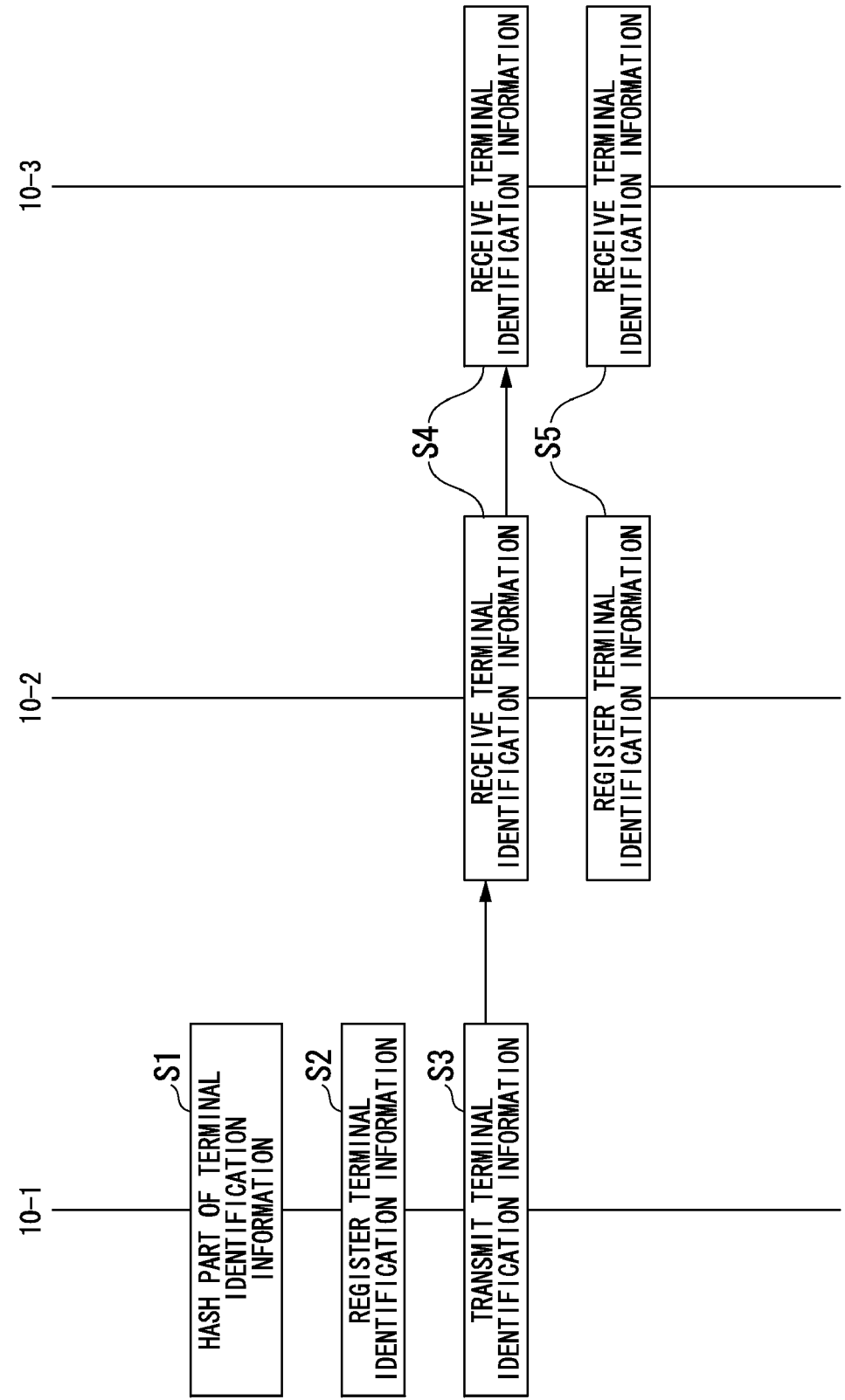
FIG. 3 is a sequence diagram showing the operations whereby terminal identification information is shared among communication systems, according to the first exemplary embodiment.

FIG. 3 is a sequence diagram showing the operations whereby terminal identification information is shared among communication systems.

Firstly, if update processing of the terminal identification information, which identifies an unauthorized terminal with respect to the communication system 10-1 by the function of the communication system 10-1 or the operation by an operator or the like, is performed, the hashing section 12 of the communication system 10-1 hashes the information set as a hashing object among the terminal identification information to be newly registered (step S1). At this time, the hash function used for hashing by the hashing section 12 is common to the communication systems 10-1 to 10-3. As a result, it is possible to use the information hashed by the communication system 10-1 in the other communication systems 10-2 and 10-3.

In step S1, if the hashing section 12 hashes part of the terminal identification information, the registration section 18 registers the terminal identification information the part of which has been hashed in the storage section 13 (step S2). The information transmission section 16 transmits the registered terminal identification information to the communication systems 10-2 and 10-3 by broadcasting (step S3). Transmission of the terminal identification information may be performed immediately after the terminal identification information is registered, or at a predetermined transmission timing, or based on a transmission request from the communication systems 10-2 and 10-3. At this time, it is desirable that the information transmission section 16 applies an electronic signature to the terminal identification information. As a result, it is possible to authenticate the sender of the sending terminal identification information.

In step S3, when the communication system 10-1 sends the terminal identification information, the information reception section 17 of the communication systems 10-2 and 10-3 receives the terminal identification information (step S4). At this time, in the case where there is an electronic signature attached to the received terminal identification information, it examines the electronic signature to verify whether or not the terminal identification information is correct.

When the information reception section 17 receives the terminal identification information, the registration section 18 registers the terminal identification information received by the information reception section 17 in the storage section 13 (step S5). As a result, it is possible to register the terminal identification information registered in the communication system 10-1 in the other communication systems 10-2 and 10-3.

The same processing is also performed in the case where the communication systems 10-2 and 10-3 transmit the terminal identification information, and the communication system 10-1 receives the terminal identification information.

Next is a description of the operation in which the communication system 10 identifies an unauthorized terminal.

Figure 4:
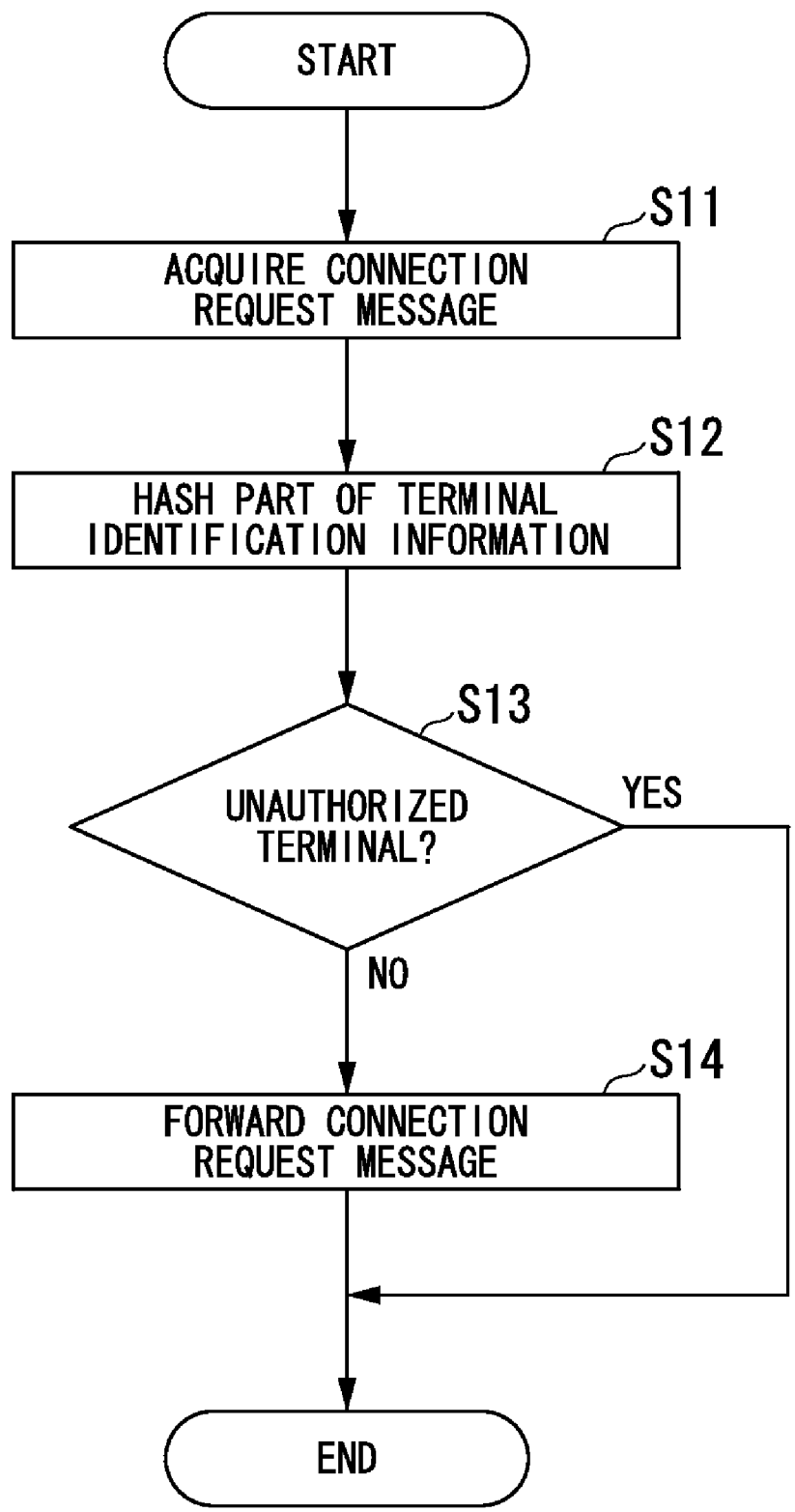
FIG. 4 is a flow chart showing the operations by which the communication system identifies unauthorized terminals, according to the first exemplary embodiment.

FIG. 4 is a flow chart showing the operations by which the communication system identifies unauthorized terminals.

Firstly, when the outgoing call terminal 20 sends a connection request message to the incoming call terminal 30, the message acquisition section 11 of the communication system 10 acquires the connection request message from the outgoing call terminal 20 (step S11). Next, the hashing section 12 hashes the information of the terminal information contained in the connection request message acquired by the message acquisition section 11, which is set as a hashing object, using a hash function common to the other communication systems (step S12).

After hashing by the hashing section 12, the determination section 14 compares the terminal identification information stored in the storage section 13 with the terminal information the part of which has been hashed by the hashing section 12, and determines whether or not the outgoing call terminal 20 is an unauthorized terminal (step S13).

For a determination method, for example in the case where a hashed telephone number that is contained in the terminal information, part of which has been hashed by the hashing section 12, is contained in terminal identification information registered in the white list stored in the storage section 13, the determination section 14 determines that the outgoing call terminal 20 is not an unauthorized terminal.

Furthermore, for example in the case where the hashed terminal ID contained in the part of the terminal information that has been hashed by the hashing section 12 is contained in terminal identification information registered in the black list stored by the storage section 13, the determination section 14 determines that the outgoing call terminal 20 is an unauthorized terminal.

Moreover, for example in the case where the type, OS (Operation System), and the information related to the installed software, and the like (this information does not need to be hashed) of the outgoing call terminal 20 contained in the terminal information the part of which has been hashed by the hashing section 12, match a predetermined number or more of the pieces of information contained in terminal identification information registered in a gray list stored in the storage section 13, the determination section 14 determines that the outgoing call terminal 20 is an unauthorized terminal.

In step S13, in the case where the determination section 14 determines that the outgoing call terminal 20 is not an unauthorized terminal (step S13: No), the message forwarding section 15 forwards the connection request message sent by the outgoing call terminal 20 to the incoming call terminal 30 (step S14). As a result, the call is established between the outgoing call terminal 20 and the incoming call terminal 30.

On the other hand, in step S13, in the case where the determination section 14 determines that the outgoing call terminal 20 is an unauthorized terminal (step S13: Yes), the message forwarding section 15 does not forward the connection request message sent by the outgoing call terminal 20 to the incoming call terminal 30, and the processing is terminated. As a result, the communication system 10 can refuse the received call from the outgoing call terminal 20, which is determined to be an unauthorized terminal.

In this manner, according to the present exemplary embodiment, when the terminal identification information stored in the storage section 13 in the communication system 10 is updated, the information transmission section 16 transmits the updated terminal identification information to other communication systems. Furthermore, when the terminal identification information is transmitted from other communication systems, the information reception section 17 of the communication system 10 receives the terminal identification information, and the registration section 18 registers the terminal identification information in the storage section 13. As a result, it is possible to reduce the duration over which there is a discrepancy in the terminal identification information among the communication systems of the other network providers.

Moreover, according to the present exemplary embodiment, when the communication system 10 transmits the terminal identification information to other communication systems, the hashing section 12 hashes information among the terminal identification information, by which the outgoing call terminal 20 can be identified uniquely, using a hash function common to the other communication systems. The information transmission section 16 transmits the hashed terminal identification information to the other communication systems. As a result, it is possible to prevent misuse of the personal information contained in the terminal identification information.

Furthermore, according to the present exemplary embodiment, the hashing section 12 hashes part of the terminal information contained in the connection request message acquired by the message acquisition section 11, which is set as a hashing object, using a hash function common to the other communication systems. The determination section 14 compares the terminal information hashed by the hashing section 12 with the terminal identification information stored in the storage section 13. As a result, it is possible to determine an unauthorized terminal using the terminal identification information hashed by other communication systems.

As above, one exemplary embodiment of this invention is described in detail with reference to the drawings. However, specific constructions are not limited to the above-described exemplary embodiment, and various design changes and the like are possible provided they do not depart from the scope of this invention.

For example, in the present exemplary embodiment, a case is described in which the hashing section 12 hashes part of information among the terminal information and the terminal identification information. However, this is not a limitation. For example, the whole information may be hashed, and in the case where there is no concern about misuse of personal information, hashing might not be needed.

Moreover, in the present exemplary embodiment, an example is described in which, in the information sharing system, the communication system 10-1 transmits the terminal identification information to the other communication systems 10-2 and 10-3 by broadcasting, to thereby share the terminal identification information. However, this is not a limitation. Hereunder is a description of exemplary embodiments in which the terminal identification information is shared using another method.

Second Exemplary Embodiment

An information sharing system according to a second exemplary embodiment of the present invention will be described with reference to the drawings.

Figure 5:
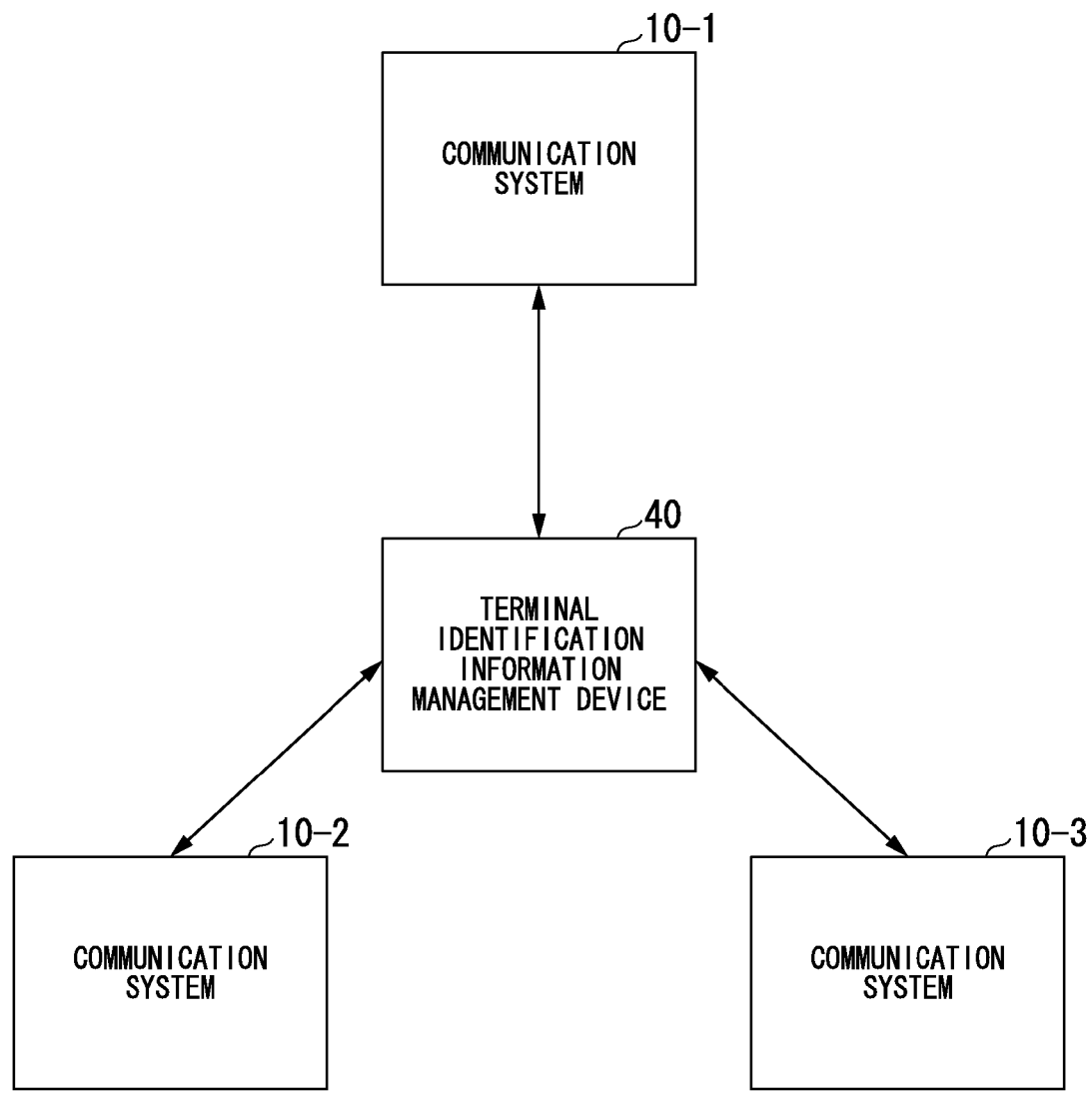
FIG. 5 is a schematic diagram showing the structure of an information sharing system according to a second exemplary embodiment, which connects communication systems.

FIG. 5 is a schematic diagram showing the structure of the information sharing system according to the second exemplary embodiment, which connects communication systems.

In the information sharing system according to the second exemplary embodiment, communication systems 10-1 to 10-3 of different network providers are each connected to a terminal identification information management device 40. The communication systems 10-1 to 10-3 have the same construction as the communication system 10 described in the first exemplary embodiment. Here, a case is described in which the information sharing system includes three systems, being the communication systems 10-1 to 10-3. However, in practice, the information sharing system includes three or more communication systems. The information sharing system may include a plurality of terminal identification information management devices 40.

When update processing of the terminal identification information for identifying an unauthorized terminal with respect to the communication system 10-1 is being performed, using the function of the communication system 10-1 or the operation of an operator or the like, the hashing section 12 of the communication system 10-1 hashes the information set as a hashing object among the terminal identification information to be newly registered. The hash function that the hashing section 12 uses for hashing is common to the communication systems 10-1 to 10-3.

When the hashing section 12 hashes part of the terminal identification information, the registration section 18 registers the terminal identification information the part of which has been hashed in the storage section 13. Then, the information transmission section 16 transmits the updated terminal identification information to the terminal identification information management device 40. Transmission of the terminal identification information may be performed immediately after the terminal identification information is updated, or at a predetermined transmission timing, or based on a transmission request from the terminal identification information management device 40.

When the communication system 10-1 transmits the terminal identification information, the terminal identification information management device 40 receives the terminal identification information. The terminal identification information management device 40 forwards the received terminal identification information to the communication systems 10-2 and 10-3. Forwarding of the terminal identification information may be performed immediately after the terminal identification information is acquired, or at a predetermined transmission timing, or based on a transmission request from the communication systems 10-2 and 10-3.

When the terminal identification information management device 40 transmits the terminal identification information, the information reception sections 17 of the communication systems 10-2 and 10-3 receive the terminal identification information. When the information reception section 17 receives the terminal identification information, the registration section 18 registers the terminal identification information received by the information reception section 17 in the storage section 13.

As a result, it is possible to register the terminal identification information registered in the communication system 10-1 in the other communication systems 10-2 and 10-3 quickly.

The same processing is also performed in the case where the communication systems 10-2 and 10-3 transmit the terminal identification information, and the communication system 10-1 receives the terminal identification information.

Third Exemplary Embodiment

Figure 6:
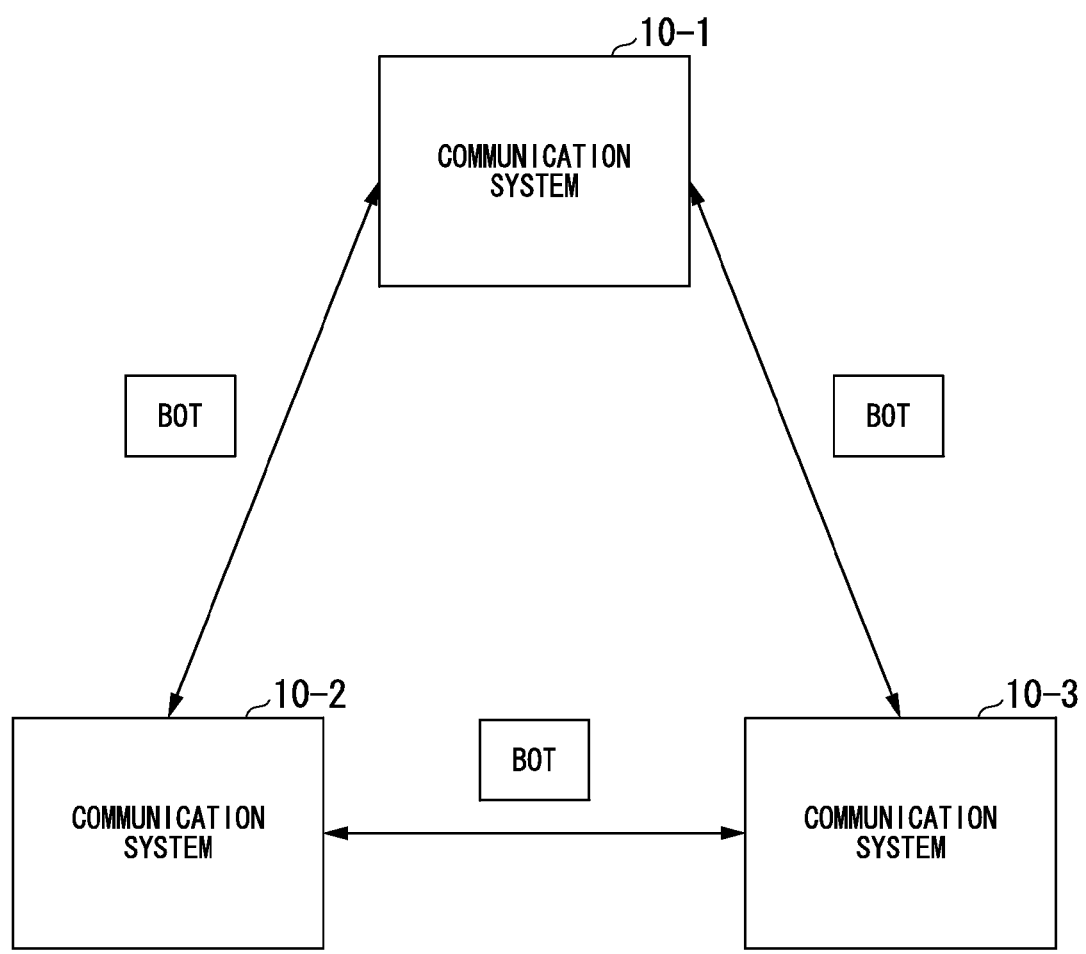
FIG. 6 is a schematic diagram showing the structure of an information sharing system according to a third exemplary embodiment, which connects communication systems.

FIG. 6 is a schematic diagram showing the structure of an information sharing system according to a third exemplary embodiment, which connects communication systems.

In the information sharing system according to the third exemplary embodiment, the communication systems 10-1 to 10-3 of different network providers are connected to each other by communication lines. The construction of the communication systems 10-1 to 10-3 is the same as the communication system 10 described in the first exemplary embodiment. Here, a case is described in which the information sharing system includes three systems, being the communication systems 10-1 to 10-3. However, in practice, the information sharing system includes three or more communication systems.

Firstly, the operation of registering terminal identification information in the communication systems 10-1 to 10-3 will be described.

When update processing of the terminal identification information for identifying an unauthorized terminal with respect to the communication systems 10-1 to 10-3 is being performed, using the function of the communication systems 10-1 to 10-3 or the operation of an operator or the like, the hashing section 12 of the communication systems 10-1 to 10-3 hashes the information set as a hashing object among the terminal identification information to be newly registered. At this time, the hash function that the hashing section 12 uses for hashing is common to the communication systems 10-1 to 10-3.

When the hashing section 12 hashes part of the terminal identification information, the registration section 18 registers the terminal identification information the part of which has been hashed in the storage section 13.

Next is a description of a method of acquiring terminal identification information by the communication system 10-1.

The communication system 10-1 executes a terminal identification information collection application (referred to hereunder as a bot) by the operation of an operator or at a predetermined timing. The bot is an application that has authentication keys for each of the other communication systems 10-2 and 10-3, performs mutual authentication with the other communication systems 10-2 and 10-3, and collects terminal identification information.

When the communication system 10-1 executes the bot, the bot accesses the communication system 10-2, and performs mutual authentication with the communication system 10-2. The information reception section 17 of the communication system 10-2 verifies whether or not the authentication key owned by the bot is correct. If the information reception section 17 determines that the authentication key is correct, the information transmission section 16 outputs the terminal identification information stored in the storage section 13 to the bot. The bot acquires the terminal identification information output by the communication system 10-2, and encodes it.

When the information reception section 17 of the communication system 10-1 receives the encoded terminal identification information from the bot, the registration section 18 decodes the received terminal identification information, and the information reception section 17 registers the decoded terminal identification information in the storage section 13. Acquisition of terminal identification information from the communication system 10-3 is also performed similarly.

As a result, the communication system 10-1 can register the terminal identification information registered in the other communication systems 10-2 and 10-3 quickly.

The same processing is also performed in the case where the communication systems 10-2 and 10-3 acquire terminal identification information.

Fourth Exemplary Embodiment

Figure 7:
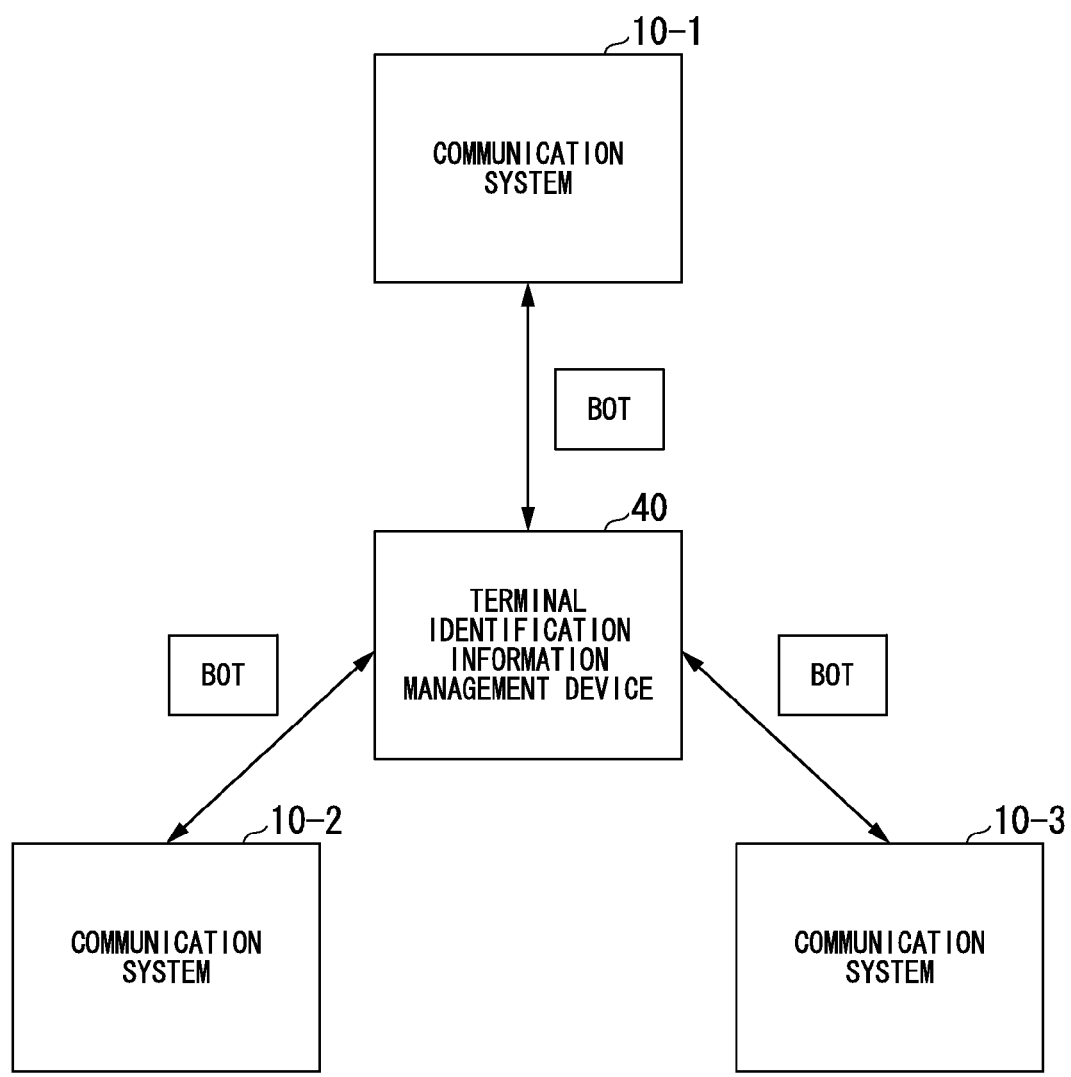
FIG. 7 is a schematic diagram showing the structure of an information sharing system according to a fourth exemplary embodiment, which connects communication systems.

FIG. 7 is a schematic diagram showing the structure of an information sharing system according to a fourth exemplary embodiment, which connects communication systems.

In the information sharing system according to the fourth exemplary embodiment, the communication systems 10-1 to 10-3 of different network providers are connected to a terminal identification information management device 40. The construction of the communication systems 10-1 to 10-3 is the same as the communication system 10 described in the first exemplary embodiment. Here, a case is described in which the information sharing system includes three systems, being the communication systems 10-1 to 10-3. However, in practice, the information sharing system includes three or more communication systems. The information sharing system may include a plurality of terminal identification information management devices 40.

The operation of registering terminal identification information in the communication systems 10-1 to 10-3 is the same as in the third exemplary embodiment.

Next is a description of a method of acquiring terminal identification information by a terminal identification information management device 40.

The terminal identification information management device 40 executes a bot (terminal identification information collection application) by the operation of an operator or at a predetermined timing. The bot is an application that has authentication keys for each of the communication systems 10-1 to 10-3, performs mutual authentication with the communication systems 10-1 to 10-3, and collects terminal identification information.

When the terminal identification information management device 40 executes the bot, the bot accesses the communication system 10-1, and performs mutual authentication with the communication system 10-1. The information reception section 17 of the communication system 10-1 verifies whether or not the authentication key owned by the bot is correct. If the information reception section 17 determines that the authentication key is correct, the information transmission section 16 outputs the terminal identification information stored by the storage section 13 to the bot. The bot acquires the terminal identification information output from the communication system 10-1, and encodes it.

When the terminal identification information management device 40 receives the encoded terminal identification information from the bot, the terminal identification information management device 40 decodes the received terminal identification information, and stores the decoded terminal identification information. Similarly, it also acquires terminal identification information from the communication systems 10-2 and 10-3.

When the terminal identification information management device 40 collects the terminal identification information from the communication systems 10-1 to 10-3, it transmits the collected terminal identification information to the communication systems 10-1 to 10-3. Transmission of the terminal identification information may be performed immediately after the terminal identification information is collected, or at a predetermined timing, or based on a transmission request from the communication systems 10-1 to 10-3.

As a result, the terminal identification information management device 40 can maintain the terminal identification information stored by the communication systems 10-1 to 10-3 in an updated state.

The above-described communication systems 10-1 to 10-3 and the terminal identification information management device 40 have computer systems inside. The above-described operations in each of the processing sections are stored in the form of a program in a computer-readable recording medium, and the above-described processing is performed by the computer reading the program and executing it. Computer-readable recording medium refers to a magnetic disc, an optical magnetic disc, a CD-ROM, a DVD-ROM, a semiconductor memory, or the like. The arrangement may be such that this computer program is delivered to a computer through a communication line, and the computer that receives this delivery executes the program.

The above-described program may also be one for realizing some of the functions described above. Furthermore, it may be one that can realize the aforementioned functions by a combination of programs that have already been stored in the computer system, namely a so-called differential file (differential program).

This application is based upon and claims the benefit of priority from Japanese patent application No. 2009-110817, filed Apr. 30, 2009, the disclosure of which is incorporated herein in its entirety by reference.

REFERENCE SYMBOLS

10. 10-1 to 10-3 Communication system
11 Message acquisition section 12 Hashing section
13 Storage section
14 Determination section
15 Message forwarding section
16 Information transmission section
17 Information reception section
20 Sending terminal
30 Receiving terminal
40 Terminal identification information management device

The invention claimed is:

1. A communication system that shares terminal identification information used for identifying a terminal that sends a spam phone call, with another communication system belonging to another network provider, the system comprising:
    a storage section that stores terminal identification information of a terminal that sends a spam phone call;
    a transmission section that transmits the terminal identification information stored in the storage section to the other communication system;
    a reception section that receives, from the other communication system, the terminal identification information used for identifying the terminal that sends the spam phone call;
    a registration section that registers the terminal identification information received by the reception section in the storage section;
    a spam phone call determination section that determines whether or not there is a match between terminal information indicating information of an outgoing call terminal that sends a connection request, and the terminal identification information stored in the storage section, thereby determining whether or not the outgoing call terminal sends a spam phone call; and the communication system further comprising: a hashing section that hashes the terminal information and the terminal identification information using a hash function common to the other communication system, wherein the reception section receives the terminal identification information hashed by the common hash function, and the spam phone call determination section determines whether or not there is a match between the terminal information of the outgoing call terminal that is hashed by the hashing section and the hashed terminal identification information stored in the storage section, thereby determining whether or not the outgoing call terminal sends a spam phone call.

2. The communication system according to claim 1, wherein the hashing section hashes part of information among the terminal information and the terminal identification information.

3. A processing method that uses a communication system including a storage section that stores terminal identification information used for identifying a terminal that sends a spam phone call, and sharing the terminal identification information with another communication system, the method comprising:
    transmitting, by a transmission section, terminal identification information stored in the storage section to the other communication system;
    receiving, by a reception section, terminal identification information used for identifying the terminal that sends the spam phone call, from the other communication system;
    registering, by a registration section, the terminal identification information received by the reception section in the storage section; and
    determining, by a spam phone call determination section, whether or not there is a match between terminal information indicating information of an outgoing terminal that sends a connection request, and the terminal identification information stored in the storage section, thereby determining whether or not the outgoing call terminal sends a spam phone call; wherein a hashing section hashes the terminal information and the terminal identification information using a hash function common to the other communication system, the reception section receives the terminal identification information hashed by the common hash function, and the spam phone call determination section determines whether or not there is a match between the terminal information of the outgoing call terminal that is hashed by the hashing section and the hashed terminal identification information stored in the storage section, thereby determining whether or not the outgoing call terminal sends as spam phone call.

4. The processing method according to claim 3, wherein the hashing section hashes part of information among the terminal information and the terminal identification information.

* * * * *